United States Patent [19]

Fitoussi et al.

[11] Patent Number: 4,869,743
[45] Date of Patent: Sep. 26, 1989

[54] METHOD OF MANUFACTURING AN OPTICAL FIBER USING A PREFORM OBTAINED BY COLLAPSING A TUBE

[75] Inventors: Jean Guy Fitoussi, Plessis Trevise; Jacques Goudeau, Bondoufle; Michel Cornebois, Saint German les Arpajon, all of France

[73] Assignee: Societe Anonyme dite:Compagnie Generale D'Electricite

[21] Appl. No.: 250,879

[22] Filed: Sep. 29, 1988

[30] Foreign Application Priority Data

Sep. 29, 1987 [FR] France .................................. 87 13439

[51] Int. Cl.⁴ .......................................... C03B 37/027
[52] U.S. Cl. ...................................... 65/3.11; 65/3.12; 65/13
[58] Field of Search ........................ 65/2, 3.11, 3.12, 13, 65/4.21

[56] References Cited

U.S. PATENT DOCUMENTS

| | | | |
|---|---|---|---|
| 4,283,213 | 8/1981 | Akers et al. | 65/3.11 |
| 4,286,978 | 9/1981 | Bailey et al. | 65/3.12 |
| 4,326,869 | 4/1982 | Kurosaki et al. | 65/13 X |
| 4,372,767 | 2/1983 | Maklad | 65/3.12 |
| 4,505,729 | 3/1985 | Matsumura et al. | 65/3.11 |
| 4,578,096 | 3/1986 | Siegmund | 65/3.11 |
| 4,764,194 | 8/1988 | Maklad | 65/3.11 |
| 4,812,154 | 3/1989 | Yoshida | 65/3.11 |

Primary Examiner—Robert L. Lindsay
Attorney, Agent, or Firm—Sughrue, Mion, Zinn, Macpeak & Seas

[57] ABSTRACT

In order to manufacture a fiber by drawing a preform, said preform is made by collapsing a thick-walled silica tube having a reduced pressure established therein and heated in successive passes. The tube is prevented from ovalizing by beginning each pass with a portion bearing against a coaxial internal conical guide. The invention is applicable to low cost fiber manufacture.

7 Claims, 1 Drawing Sheet

METHOD OF MANUFACTURING AN OPTICAL FIBER USING A PREFORM OBTAINED BY COLLAPSING A TUBE

The present invention relates to manufacturing optical fibers.

A prior art method of manufacturing such fibers includes various operations which are common, at least in some respects, both to said prior art method and to the method of the invention.

To begin with, these operations are listed:

A first common operation consists in obtaining, either by manufacture or by purchase, a tube of glass which has been subjected to various treatments and which is referred to below as a "treated tube". This tube is typically made of silica. Geometrically speaking, it may be defined by the fact that it has an axis, a length along said axis running from a rear end to a front end, and a thickness extending between two cylindrical surfaces, namely an inside surface and an outside surface, which are surfaces of revolution about said axis and which define an inside diameter and an outside diameter respectively. The inside surface surrounds an inside space. Both the composition and the refractive index of the tube glass vary across its thickness with distance from said axis in such a manner as to form a core layer extending in said thickness from said inside surface and a cladding layer having a lower refractive index and surrounding said core layer.

This treated tube is conventionally obtained by treatment during which said cladding and core layers are formed on the inside surface of a substrate tube by successive deposits of doped silica. Such a deposit is obtained from a mixture of reaction gases which flows in the inside space of the substrate tube and which decomposes locally in a hot zone. This zone is heated by means of a torch disposed outside the tube and which sweeps along the length of the tube in order to obtain a uniform deposit. The tube is simultaneously rotated about its horizontal axis.

Processes known under the initials "MCVD", "PCVD", "SPCVD", ... exist for obtaining such internal deposits in the context of manufacturing optical fibers. The substrate tubes used in this context are normally about 2 mm to 3 mm thick, and the deposited layers may have a total thickness of about 1 mm.

The next one of said common operations is collapsing said treated tube. This operation comprises using heater means to heat a zone of the length of said tube to a collapsing temperature which is accompanied by a softening of said glass and by a reduction in the inside and outside diameters of said tube. This collapsing operation includes a plurality of passes by a heater means running along said tube from said rear end to said front end. These passes continue until said inside space disappears. A solid cylindrical preform is thus formed comprising a core formed from said core layer and surrounded by cladding formed from said cladding layer.

Such tubes are generally collapsed using more than two passes of a heater means constituted by a hydrogen-oxygen torch, as follows:

The treated tube is held between the jaws of a horizontal axis glass-makers' lathe, is rotated, and is heated. In moving from one end to the other of the useful portion of the tube, the torch raises the temperature of the material thereof to a level where the effect of surface tension forces is to reduce the diameter of the tube (2,100° C. to 2,200° C. at the outside surface of the tube).

After a certain number of passes, the tube is completely collapsed and the resulting rod of glass constitutes said preform.

The next one of said common operations is making a fiber from said preform. This operation comprises heating an end zone of the length of said preform and drawing said zone as to progressively reduce the diameter of the heated glass and form an optical fiber comprising a core and optical cladding formed respectively from said core and said cladding of the preform.

The cost price per kilometer of the fiber obtained in this way can be reduced if the thickness of the treated tube is increased. However, it is observed experimentally, that the above-described prior art method is no longer usable when the tube thickness becomes large, i.e. greater than 10 mm, or merely greater than 5 mm.

Such thicknesses usually prevent the surface tension forces on their own from sufficing for the collapsing operation.

However, a tube may be fully collapsed providing a vacuum pump is used for maintaining the inside of the tube at reduced pressure relative to atmospheric pressure, e.g. at a pressure of a few tens of Pascals. However, in this case, dimensional fluctuations and irregularities in commercially available substrate tubes, and non-uniformities in heating due thereto cause the treated tube to become highly ovalized during the collapsing operation. Such ovalization makes the preform unusable.

Such a risk of ovalization during the collapsing operation may also appear, although generally to a lesser extent, when using tubes of intermediate thickness, e.g. 4 mm, which may be fully collapsed without such pressure reduction.

The objects of the present invention include, in particular, retaining the circular shape of such a treated tube while it is being collapsed, in particular if the tube is thick-walled and if its inside pressure is reduced in order to facilitate the collapsing operation, thereby making it possible to use thicker-walled tubes than before for making preforms for manufacturing optical fibers, and thus reducing the cost price of such fibers.

The method of the present invention includes said common operations. Compared with the above-described prior art method including said operations, the invention is characterized by the fact that prior to said collapsing operation, it further includes an operation of installing a collapsing guide, said guide having a surface of revolution about said axis, said guide penetrating into said inside space of said treated tube at said rear end thereof, having a length inside said inside space, and terminating at its front end inside said tube at a point which is in the proximity of said rear end. Using such a guide makes it possible to obtain the following effects: At the beginning of any one of said passes of said heater means during said collapsing operation, said diameter reduction which accompanies said heater means heating a non-guided rear portion of the length of said tube causes the inside surface of said portion to bear against a facing portion of the length of said guide. This tube portion is thus guided to take up the form of a body of revolution about said axis, and is thus circular in section at the position where the tube ceases to be supported by the guide. While said heater means subsequently moves forward, the portion which has thus just been guided and which has cooled and become rigid causes the next succeeding portion of said tube in the forward direction to take up the same circular shape with the same diameter when it is heated in the same way by said heater means and is therefore subjected to said diameter reduction. The portion whose circular shape has just been induced in this way causes the next portion to take up the same shape and so on until said heater means reaches the front end of said tube. In other words, according to the invention, mechanical guidance is provided for the tube during the initial instants only of each pass, i.e. over a very short portion of the length of the tube, and that is enough to obtain a cylindrical shape over the entire length of the tube.

In the context of the present invention, the following sometimes-preferred dispositions may also be adopted:

When said collapsing operation comprises a succession of more than two of said passes by said heater means during which said inside diameter of the treated tube takes up successively smaller values starting from an initial diameter, said collapsing guide has a rear diameter at said rear end which is slightly smaller than said initial inside diameter of said treated tube, the diameter of said guide decreasing forwardly from its said rear diameter in such a manner that at the beginning of each successive pass, successive portions of the length of the inside surface of said treated tube are caused to bear against successive facing portions of the length of said guide, said portions following one another from the rear end towards the front end and having successively smaller diameters.

Said collapsing guide is substantially in the form of a circular cone about said axis with its point extending forwardly.

During said collapsing operation, said inside space of said treated tube is subjected to a collapsing pressure reduction relative to the outside atmosphere in such a manner as to enable said reduction of said inside and outside diameters of said tube to take place during said pass of said heater means.

Said outside diameter of the treated tube lies between 30 mm and 80 mm, and said initial inside diameter lies between 10 mm and 30 mm, said tube thickness being not less than 20 mm, and said collapsing pressure reduction lying between 10% and 100% of atmospheric pressure.

An implementation of the present invention in the context of the explanation given above is described more particularly below by way of non-limiting example and with reference to the accompanying diagrammatic figures. When the same item appears in several figures, it is designated therein by the same reference symbol.

The implementation described includes the above-mentioned sometimes-preferred dispositions. It should be understood that the items mentioned may be replaced by other items which provide the same technical functions.

In these figures, the horizontal axis of the treated tube to be collapsed is referenced A. The tube itself is referenced 2 and its rear and front ends are referenced 30 and 33, respectively. The tube is made of silica. By way of example, its outside diameter is 50 mm, its inside diameter after deposition is 18 mm, and its length is 500 mm.

Figure 1:
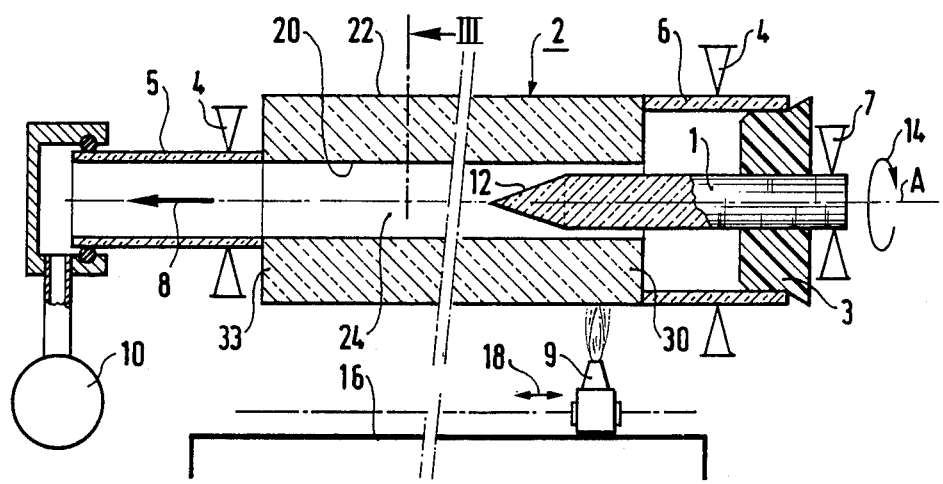
FIG. 1 is an axial section through a silica tube blank for such a collapsing operation, with the means for performing said operation also being shown.
Figure 2:
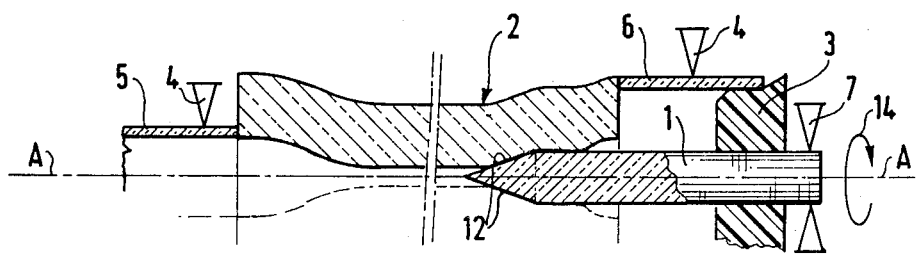
FIG. 2 is a fragmentary axial section through the same items at the beginning of a pass of said heater means during said collapsing operation.
Figure 3:
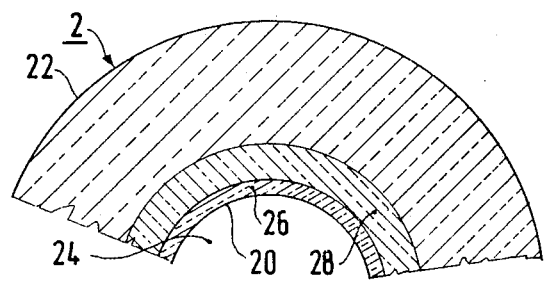
FIG. 3 is a cross-section through an angular segment of the FIG. 1 silica tube in a plane III of FIG. 1, and on a larger scale.

Said inside and outside surfaces of said tube are referenced 20 and 22, respectively, and said inside space is referenced 24. Said core and cladding layers are referenced 26 and 28, respectively, see FIG. 3.

Pumping means 10 are disposed at the front end of the tube 2. The tube is fitted with two silica end pieces, a piece 5 (e.g. having an outside diameter of 25 mm, and an inside diameter of 20 mm) at its pumping end, and a piece 6 (e.g. having an outside diameter of 50 mm and an inside diameter of 45 mm) at its other end. These end pieces are placed in the jaws 4 of a glass-makers' lathe, not shown.

The collapsing guide is a front portion 12 of a silica stick 1. This portion is about 30 mm long and has a conical guide surface. The diameter of the stick 1 is chosen to be as close as possible to the inside diameter of the tube 2. For example this diameter is 17 mm.

By means of an additional lathe jaw 7, the stick 1 is positioned coaxially in such a manner as to cause its conical end to penetrate fully into the inside of the tube 2 to be collapsed. The empty space between the end piece 6 and the stick 1 is closed by a plug 3 (e.g. made of rubber).

Pumping is then switched on in the direction of arrow 8 and a pressure of about several tenths of a Pascal, e.g. 1.3 Pa, is maintained inside the tube 2.

The lathe is caused to rotate in the direction of arrow 14 (e.g. at a speed of about 60 revolutions per minute (rpm)) and heating is commenced using the torch 9 (which begins by remaining stationary) at the same end as the stick 1 until the tube 2 adheres to the largest diameter of the stick 1.

The torch 9 is then moved in translation forwardly along a translation bench 16 in the direction of arrow 18 at a suitable speed (e.g. 5 mm per minute) to ensure that the phenomena of collapsing and adherence take place along a first rear portion of the conical surface of the stick 1. This speed is selected by taking account of the quantity of heat delivered by the torch (measured by the flow rates used of oxygen and hydrogen, e.g. 60 to 70 liters per minute of oxygen and 150 to 160 liters per minute of hydrogen).

The conical surface of the stick 1 then serves as a starting guide, and so to speak forces the initial portion of the thick silica tube 2 to conserve circular symmetry about the axis at the beginning of the collapsing operation.

During subsequent displacement of the torch, the portions of the collapsed tube which have solidified define, in turn, the shape of the following portions, thereby enabling the entire tube to retain circular symmetry during the entire pass of the torch.

The desired number of torch passes is performed as a function of the available heating power in order to obtain a fully collapsed tube (e.g. 6 to 8 passes). Successive portions of the guide surface 12 serve as starting guides at the beginning of each of these successive passes.

These portions follow one another from the rear to the front of the tube with decreasing diameters.

At the end of this process, the tube is cut at its ends, and in particular it is cut level with the end of the conical surface 12, and the preform is thus completed.

We claim:

1. A method of manufacturing an optical fiber from a preform obtained by collapsing a tube, said method comprising the following operations:

obtaining a treated tube having an axis, a length which extends along said axis from a rear end to a front end, a thickness which extends between two cylindrical surfaces, namely an inside surface and an outside surface which are both surfaces of revolution about said axis and which define an inside diameter and an outside diameter respectively, said inside surface surrounding an inside space, said tube being made of a glass whose composition and whose refractive index vary across its thickness with increasing distance from said axis so as to form a core layer extending through said thickness from said inside surface, and a cladding layer having a lower refractive index and surrounding said core layer;

collapsing said treated tube, said collapsing operation including heating a zone of the length of said tube by heater means to a collapsing temperature which is accompanied by a softening of said glass and by a reduction in said inside and outside diameters of said tube, said collapsing operation comprising a plurality of passes of a heater means running along said tube from said rear end to said front end, said passes following one another until said inside space disappears so as to form a solid cylindrical preform comprising a core formed from said core layer and surrounded by cladding formed from said cladding layer; and making a fiber from said preform, said operation of making a fiber comprising heating an end zone of the length of said preform and in drawing said zone so as to progressively reduce the diameter of the heated glass to form an optical fiber comprising a core and optical cladding formed respectively from said core and said cladding of said preform;

said method being characterized by the fact that, prior to said collapsing operation, it further includes an operation of installing a collapsing guide, said guide having a surface of revolution about said axis, said guide penetrating into said inside space of said treated tube at said rear end thereof, having a length inside said inside space, and terminating at its front end inside said tube at a point which is in the proximity of said rear end, such that at the beginning of any one of said passes of said heater means during said collapsing operation, said diameter reduction which accompanies the heating by said heater means of a non-guided rear portion of the length of said tube causes the inside surface of said portion to bear against a facing portion of the length of said guide, and such that said tube portion is thus guided to take up the form of a body of revolution about said axis, and that while said heater means subsequently moves forwards, the portion which has thus just been guided and which has cooled and become rigid causes the next succeeding portion of said tube in the forwards direction to take up the form of a body of revolution when it is heated by said heater means and is subjected to said diameter reduction, and so on until said heater means reaches the front end of said tube.

2. A method according to claim 1, wherein said collapsing operation comprises a succession of more than two of said passes by said heater means during which said inside diameter of the treated tube takes up successively smaller values starting from an initial diameter:

the method being characterized by the fact that said collapsing guide has a rear diameter at said rear end which is slightly smaller than said initial inside diameter of said treated tube, the diameter of said guide decreasing forwardly from its said rear diameter in such a manner that at the beginning of each successive pass, successive portions of the length of the inside surface of said treated tube are caused to bear against successive facing portions of the length of said guide, said portions following one another from the rear end towards the front end and having successively smaller diameters.

3. A method according to claim 2, characterized by the fact that said collapsing guide is substantially in the form of a circular cone about said axis with its point extending forwardly.

4. A method according to claim 2, characterized by the fact that during said collapsing operation, said inside space of said treated tube is subjected to a collapsing pressure reduction relative to the outside atmosphere in such a manner as to enable said reduction of said inside and outside diameters of said tube to take place during said pass of said heater means.

5. A method according to claim 4, characterized by the fact that said outside diameter of the treated tube lies between 30 mm and 80 mm, and said initial inside diameter lies between 10 mm and 30 mm, said tube thickness being not less than 20 mm, and said collapsing pressure reduction lying between 10% and 100% of atmospheric pressure.

6. A method according to claim 1, wherein, during said collapsing operation, said axis of the treated tube is horizontal and said tube is continuously rotated about said axis.

7. A method according to claim 1, wherein, said glass constituting said treated tube is silica, and said collapsing guide is also made of silica.

* * * * *